A. W. MALONE
POLE
Sept. 15, 1931. Re. 18,196
Original Filed Sept. 24, 1928
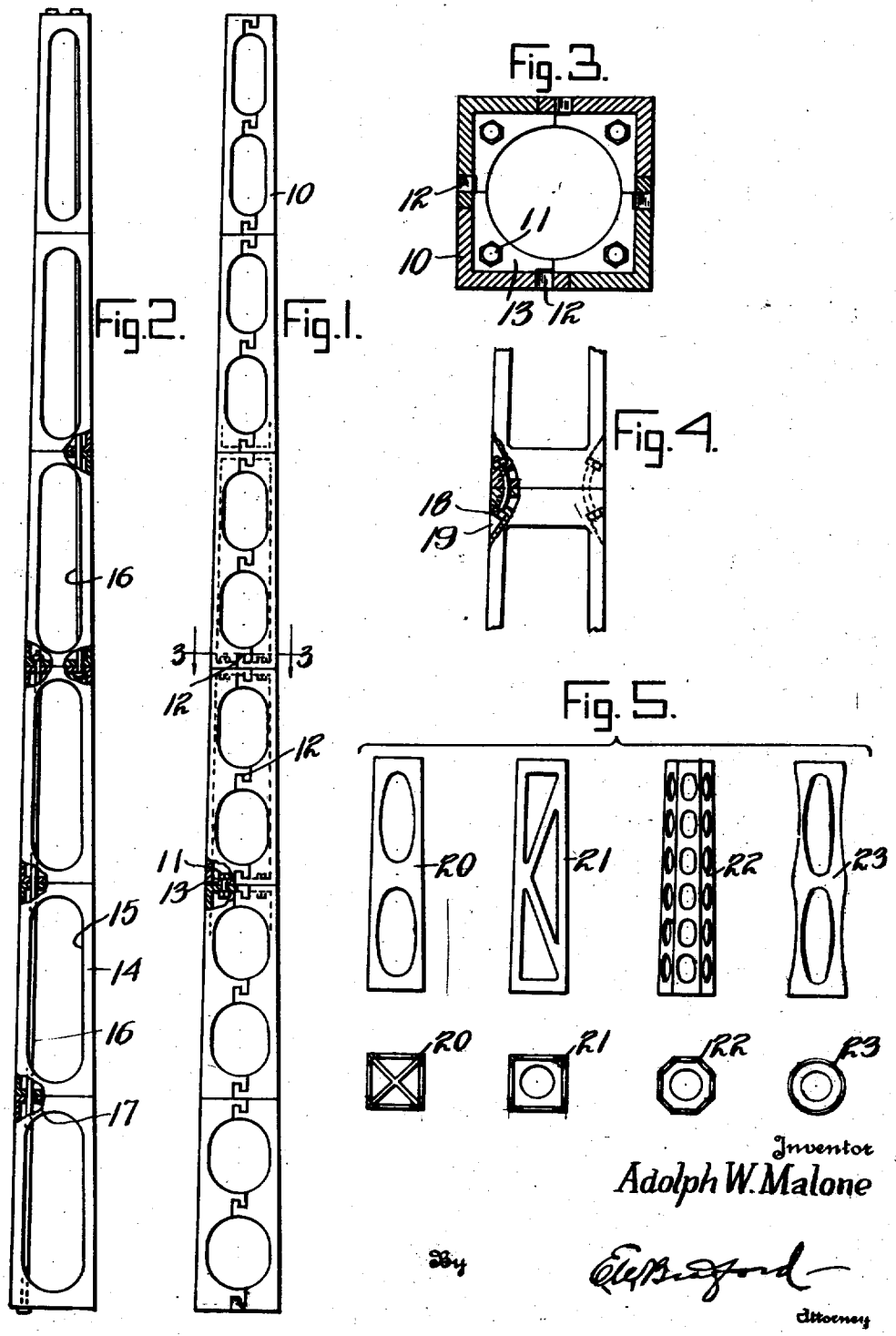
Inventor
Adolph W. Malone
By
Attorney Reissued Sept. 15, 1931

Re. 18,196

UNITED STATES PATENT OFFICE

ADOLPH W. MALONE, OF FILLMORE, UTAH, ASSIGNOR OF ONE-THIRD TO ALBERT H. VESTAL, OF ANDERSON, INDIANA, AND ONE-THIRD TO EDWIN S. HEALY, OF NEW YORK, N. Y.

POLE

Original No. 1,696,772, dated December 25, 1928, Serial No. 307,981, filed September 24, 1928. Application for reissue filed July 21, 1931. Serial No. 552,273.

My invention relates to a pole or post intended primarily to be used for supporting telephone and telegraph lines, but capable of being employed for various other purposes; and it is an object of the invention to provide a sectional metal pole made up of any desired number of sections, which may be readily built up or taken apart, and of simple and inexpensive construction; all as will be hereinafter more particularly described and claimed.

Referring to the accompanying drawings, which are made a part hereof and on which similar reference characters indicate similar parts, Figure 1 is a side elevation partly in section, of a pole, illustrating one application of my invention, Figure 2, a similar view, showing a modified form of pole, Figure 3, a section on the line 3—3 of Fig. 1, Figure 4, a fragmentary detail side elevation, partly in section, illustrating a further modified form, and Figure 5, a view illustrating a number of modified forms of pole sections.

In the drawings, reference character 10 indicates a corner leg or portion of a metal pole, four of said corner portions being combined to form a longitudinal section of the pole, any desired number of which may be used. The pole sections may be secured together by bolts or other fastening means 11. Each section of the pole is formed of four corner portions 10 slightly tapering from end to end and having two sides disposed at right angles and provided at their edges with interlocking lugs or fastening elements 12 which are adapted to be engaged by similar complementarily formed lugs or fastening elements on the adjacent corner member of the pole.

The pole sections are fastened together by the fastening bolts 11 at each corner within the angle formed by the two sides, and in order to provide sufficient foundation or support for the fastening bolts the extremities of the sections are provided with transverse web plates or inturned flanges 13, the inner edge surfaces of which are curved to form, when combined with the other sections, a circular opening. Likewise, the corner members are provided with opposed elongated cut-out portions or complementarily formed openings which when the parts are in position form oval shaped openings which give the appearance of a light-weight skeleton frame, such frame however possesses sufficient strength to withstand the stress to which the pole is adapted to be subjected.

In Fig. 2 I have shown a pole formed of a plurality of sections, each section instead of being formed of four castings as shown in Fig. 1, comprises a single casting 14 having an elongated opening 15 at each side, said castings being secured together in groups of three by bolts 16 located at diagonally opposite corners, the bolts of one group being staggered relative to the bolts of the next adjacent group. Also the ends of each section are provided with inturned flanges 17 similar to the flanges 13 previously described. If desired, the pole sections shown in Fig. 1 may be fastened together in the same manner as in Fig. 2, by long bolts 16. A pole like that shown in Fig. 2 is of course much simpler and less expensive to manufacture and is also lighter in construction.

In Fig. 4 I have shown a joint between pole sections of the same general character as those shown in Fig. 2, with bolts 18 inserted from the exterior in curved openings 19, such fastenings being applied in a manner to engage the strongest portions of each section.

In Fig. 5 I have shown a plurality of pole sections 20, 21, 22 and 23, also of cast metal but of different designs which may be used in lieu of those shown in the other figures, and while I have shown only a few of such designs it will be understood of course that not only square, octagonal and circular poles may be used, but those of any preferred configuration as well.

It will be obvious to those skilled in the art that various changes may be made in my device without departing from the spirit of the invention, and I therefore do not limit myself to what is shown in the drawings and described in the specification, but only as set forth in the appended claims.

Having thus fully described my said invention, what I claim as new and desire to secure by Letters Patent, is:

1. A pole comprising a plurality of longitudinal sections disposed in abutting end to end relation, and clamping means securing the sections together, each section of said pole being made up of a plurality of independent members having complementarily formed interlocking elements, substantially as set forth.

2. A cast metal pole comprising a plurality of pole sections secured together in end to end relation, each of said pole sections comprising a plurality of longitudinally arranged complementarily formed members having interlocking elements to hold the parts together and fastening elements for securing the sections of the pole together and for preventing the disengagement of the members forming each section, substantially as set forth.

3. A member adapted to be combined with other members of a similar character for forming a section of a pole, said member comprising a pair of flanges disposed substantially at right angles, provided at one of their edges with outwardly and downwardly extending portions forming interlocking lugs for engagement with complementary lugs on an adjacent section, substantially as set forth.

4. A pole comprising a plurality of abutting sections disposed in end to end relation, each formed of a plurality of longitudinal complementary members having complementarily formed interlocking elements for holding the parts together, and fastening means for securing the pole sections together, substantially as set forth.

5. A pole comprising a plurality of sections each formed of a plurality of members provided with complementarily formed interlocking portions, and concealed fastening means for securing the sections of the poles together whereby the sections are held in engagement, substantially as set forth.

6. The combination of a plurality of elongated members having complementary interlocking elements for holding the members together, said members when combined forming a pole section and being adapted to be secured in abutting end to end relation with other members to form a complete pole, and fastening elements holding said pole sections in end to end relation whereby the members forming each section are held against relative longitudinal movement, substantially as set forth.

7. A pole comprising a series of cast metal sections disposed in end to end abutting relation to each other the abutting ends of the respective sections being provided with inwardly extending transverse web plates or flanges to serve as adjoining contact surfaces, and means within the pole structure for securing said several sections together end to end with the faces of said web plates in supporting contact, each of said sections being formed with openings for access to said securing means.

8. A metal pole comprising a series of cast metal sections secured together in end to end relation, the abutting ends of the several sections being formed with web plates extending inwardly at right angles with the axis of the pole to form supporting surfaces at the joints, and means within the pole structure for rigidly securing said sections together at said joints, whereby a continuous cast metal pole is provided of appropriate form and with a smooth exterior and of such length as may be desired.

9. A metal pole comprising a series of cast metal sections of tapered form the base of one section corresponding in diameter to the top of the section immediately beneath, which sections are secured together in end to end relation, the abutting ends of the several sections being formed with web plates extending inwardly at right angles with the axis of the pole to form supporting surfaces at the joints, and means within the pole structure for rigidly securing said sections together at said joints, whereby a continuous cast metal pole is provided of appropriate form and with a smooth exterior and of such length as may be desired.

In witness whereof, I have hereunto set my hand at Washington, in the District of Columbia, this 18th day of July, 1931.

ADOLPH W. MALONE.